Dec. 10, 1963  N. J. HEIKKINEN  3,113,999
PACKING GLAND FOR SOFT-CORED UNDERWATER ELECTRICAL CABLE
Filed May 24, 1962
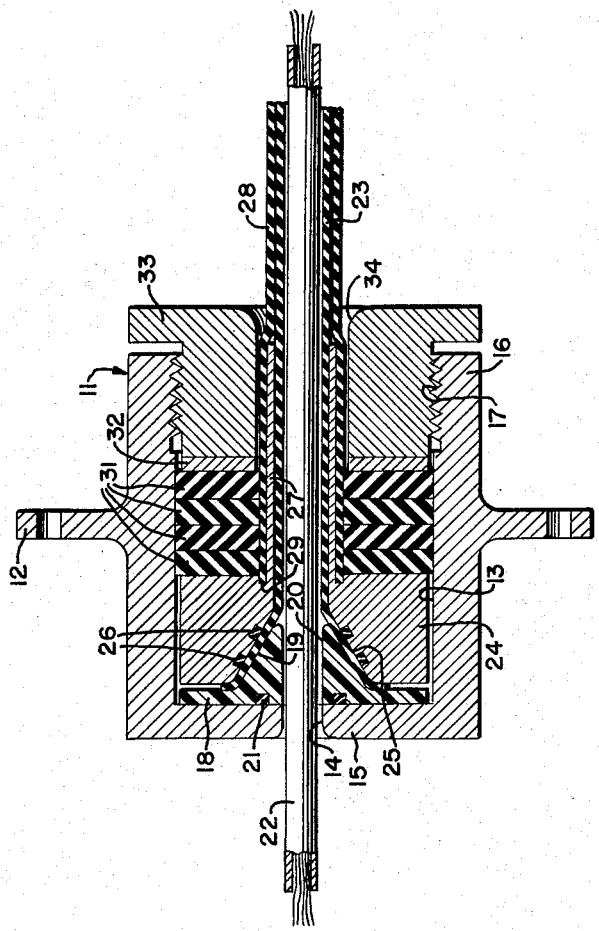
INVENTOR.
NORMAN J. HEIKKINEN
ATTY.
AGENT.

3,113,999
PACKING GLAND FOR SOFT-CORED UNDER-
WATER ELECTRICAL CABLE
Norman J. Heikkinen, Washington, D.C., assignor to the
United States of America as represented by the Secretary of the Navy
Filed May 24, 1962, Ser. No. 197,547
5 Claims. (Cl. 174—151)
(Granted under Title 35, U.S. Code (1952), sec. 266)

The invention described herein may be manufactured and used by or for the Government of the United States of America for governmental purposes without the payment of any royalties thereon or therefor.

This invention relates to sealing apparatus and more particularly to a packing gland for soft core multi-conductor cables subject to high pressures for long durations.

When exposed to very high pressures, the jacket of multi-conductor cables does not maintain its round shape and assumes the shape of the inner core or bundle. This in fact, as well as the squeeze caused by the external pressure on the core, it not desirable in many types of cables. For example, when the core includes coaxial cables and multiple shielded conductors, insulation resistance is of paramount importance. Also, the use of expensive equipment and the need for safety and/or precise results will not tolerate any leakage or cable core creep when the cable is exposed to high pressures. At the present time, existing packing glands suffer the disadvantages of allowing cable squeeze and cable extrusion at high pressures, thereby impairing sealing reliability under high pressure conditions.

The general purpose of this invention is to provide a packing gland which embraces all the advantages of similarly employed packing glands and possesses none of the of the afore-described disadvantages. To attain this, the present invention contemplates a unique packing gland construction whereby cable squeeze and cable extrusion at high pressure conditions are eliminated by utilizing multiple cable jackets to absorb all cable thrusts and greatly reduce the packing washer squeeze transmitted to the inner bundle or core.

An object of the present invention is the provision of a new and improved packing gland for soft core multi-conductor cables utilized in extreme pressure environments.

Another object is to provide a packing gland of the character described which eliminates cable squeeze and extrusion in high pressure applications.

A further object of the invention is the provision of a packing gland which is small, compact and reliable, requires no maintenance or adjustment under varying pressure conditions, and which may be easily assembled remote from the area in which it is to be used.

Still another object is to provide a packing gland for a multi-conductor cable utilizing multiple cable jackets which results in minimized creep and accordioning of the outside jacket, increased absorption of the cable thrust by the jackets, absorption by the outer jacket of the wear caused by abrasion and cutting, and increased sealing reliability.

Other objects and various further features of novelty and invention will be apparent to those skilled in the art from a reading of the following specification and claims in conjunction with the accompanying drawing, which shows, for illustrative purposes only, a preferred form of the invention and in which the figure discloses an elevational view, partly in section, of the preferred embodiment of the invention.

In the illustrated example of the invention, the reference numeral 11 designates the housing for the packing gland which has a flanged portion 12 formed integrally therewith and having apertures therein for mounting purposes. The housing 11 has a circular bore 13 therein and a central aperture 14 in the end 15 thereof which extends into the bore 13. Adjacent the open end 16 of the housing, the bore 13 is provided with a threaded portion 17 to allow for the closing of the open end 16 by the insertion of a threaded nut 33. A circular plate 18 having an integral ramp portion 19 and a central aperture 20 therethrough of the same size as the aperture 14 is disposed within the housing bore 13 adjacent the end 15. The plate 18 may be formed of Teflon or a similar material and is in sealing relationship with the housing end 15 because of the positioning of an O-ring 21 between the plate 18 and the end 15.

The cable core or bundle 22 extends through the apertures 20 and 14, while the inner cable jacket 23 is retained between the ramp portion 19 and a steel sealing block spacer 24 having a surface 25 parallel to that of the ramp portion 19. A pair of O-rings 26 are provided between the block 24 and the inner cable jacket 23 to increase the sealing reliability of the gland. The sealing block 24 is provided with an axially extending sleeve 27 formed integrally therewith which extends between the inner cable jacket 23 and the outer cable jacket 28 for a purpose to be described hereinafter. The sealing block 24 is provided with a circular recess 29 adjacent the sleeve 27 to receive the end of the outer cable jacket 28. A plurality of resilient (preferably rubber) washers 31 are disposed adjacent the sealing block spacer 24 and around the outer cable jacket 28 and the sleeve 27. A steel washer 32 is provided adjacent the resilient washers 31, and a plug 33 having a central aperture 34 to receive the cable is threaded into the open end 16 of the housing into contact with the steel washer 32. As the plug 33 is advanced, the washers 31 are compressed and expanded transversely for better sealing, and the spacer 24 is forced against the ramp portion 19 to retain the inner cable jacket 23 therebetween.

The retention of the end of the inner cable jacket 23 between the ramp portion 19 and the sealing block spacer surface 25 results in a substantial reduction in cable extrusion and therefore prevents accordioning of the outer cable jacket 28. In addition, the provision of the axially extending sleeve 27 between the inner and the outer cable jackets 23 and 28 respectively insures against transmission of the resilient washer expansion to the inner core or bundle of the cable owing to the rigidity of the sleeve 27. Therefore, because of the sealing reliability of the present invention, such a packing gland may be very useful in submarine torpedo door umbilical cord installation, mines, complex missile connections, external connections to submarine radar towers, submarine bridge controls, deep ocean experimental craft and equipment, or other possible trouble leak areas where cable squeeze on multi-conductor cables is not desired or cannot be tolerated.

While the invention has been described in detail with reference to the preferred form shown it will be understood that modifications may be made within the scope of the invention as defined in the appended claims.

What is claimed is:

1. A packing gland for a soft-cored underwater electrical cable having inner and outer cable jackets comprising a hollow housing having an open end and a closed end with an aperture therein for receiving the cable core therethrough, a plate member disposed within said housing adjacent said closed end and having an axially extending ramp portion upon which an end portion of the inner cable jacket is disposed and an aperture therethrough to receive the cable core, a sealing block located within said housing and surrounding said ramp portion and the end portion of the inner cable jacket to retain the inner jacket on said ramp portion, said sealing block having an axially extending sleeve located between the inner and outer cable jackets and a groove therein adjacent said sleeve to receive the end portion of the outer cable jacket surrounding said sleeve, a plurality of washers disposed within said housing and surrounding said sleeve and the inner and outer cable jackets, and a plug insertable in said open end of said housing to seal said open end and apply pressure to said washers, said spacing block and said ramp portion, whereby the inner cable jacket is retained in position to avoid the extrusion thereof and said sleeve prevents the transmission of washer squeeze pressure to the inner jacket and cable core.

2. The apparatus of claim 1 wherein said housing has an external flange portion formed integrally therewith and a plurality of holes therein for mounting purposes.

3. The apparatus of claim 1 wherein O-rings are provided between said sealing block and the end portion of the inner cable jacket adjacent said ramp portion.

4. The apparatus of claim 1 wherein said washers comprise a plurality of rubber washers and a steel washer adjacent thereto.

5. The apparatus of claim 1 wherein said plug is threaded and the interior surface of said housing adjacent the open end thereof is threaded to retainably receive said plug therein.

References Cited in the file of this patent

UNITED STATES PATENTS

| | | |
|---|---|---|
| 2,497,706 | Wetherill | Feb. 14, 1950 |
| 2,655,638 | Allen | Oct. 13, 1953 |
| 2,785,385 | Figueira | Mar. 12, 1957 |

FOREIGN PATENTS

| | | |
|---|---|---|
| 121,738 | Germany | July 2, 1901 |
| 528,417 | Germany | June 29, 1931 |